United States Patent
Sakurai et al.

[11] Patent Number: 6,147,776
[45] Date of Patent: Nov. 14, 2000

[54] APPARATUS FOR CONTROLLING A SCANNING SPEED OF AN IMAGE SCANNER

[75] Inventors: Tetsuo Sakurai, Sagamihara; Yoshiharu Niito, Yokohama; Syuuichi Yamazaki, Fuzimi, all of Japan

[73] Assignee: Ricoh Company, Ltd., Tokyo, Japan

[21] Appl. No.: 09/106,906

[22] Filed: Jun. 30, 1998

[30] Foreign Application Priority Data

Jun. 30, 1997 [JP] Japan ................................. 9-173383

[51] Int. Cl.[7] .................................................. H04N 1/04
[52] U.S. Cl. ........................ 358/471; 358/474; 358/496; 358/497
[58] Field of Search .................................. 358/474, 486, 358/412, 471, 497, 494, 496; 318/696, 685

[56] References Cited

U.S. PATENT DOCUMENTS

| | | | |
|---|---|---|---|
| 4,920,419 | 4/1990 | Easterly | 358/214 |
| 4,947,267 | 8/1990 | Masaki et al. | 358/426 |
| 5,045,763 | 9/1991 | Kobayashi et al. | 318/270 |
| 5,198,909 | 3/1993 | Ogiwara et al. | 358/412 |
| 5,949,923 | 9/1999 | Ikeda | 382/298 |
| 5,970,181 | 10/1999 | Ohtsu | 382/274 |
| 6,009,292 | 12/1999 | Jinbo et al. | 399/208 |

*Primary Examiner*—Cheukfan Lee
*Attorney, Agent, or Firm*—Oblon, Spivak, McClelland, Maier & Nuestadt, P.C.

[57] ABSTRACT

An image scanner, including an optical image reading unit which reads an image from a document and a carriage which carries the optical image reading unit. Also included is a motor which drives the carriage, and a driver which outputs a sequence of drive signals to drive the motor. Further, a timing of each drive signal of the sequence of drive signals output by the driver is selected in accordance with a desired incremental magnification of the document. In addition, the incremental magnification of the document may be selected in steps of 0.1%.

13 Claims, 4 Drawing Sheets

APPARATUS FOR CONTROLLING A SCANNING SPEED OF AN IMAGE SCANNER

BACKGROUND OF THE INVENTION

1. Field of the Invention

The present invention relates to an image scanner in which a scanning speed is controlled. The image scanner is used in an image forming apparatus, such as a copy machine, a printer and a facsimile.

2. Discussion of the Background

Currently, there exists image scanners in which a scanning speed may be controlled. In these image scanners, a scanning operation is executed by using a stepping motor and the scanning speed is controlled by controlling a pulse rate for the stepping motor.

The image scanners include a Central Processing Unit (CPU) which calculates the pulse rate for the stepping motor according to a system clock. The system clock is divided and input to the CPU. The CPU then controls the stepping motor using an external port.

In a scanner, a scanning speed is changed for scaling a sub-scanning direction. For this changing scanning speed, a value of an internal timer of the CPU is changed to change the rotation speed of the stepping motor.

Most scanners include a scaling function which allow, for example, a magnification of 25%–400% to be set in increments of 1%. However, smaller steps, for example 0.1% are desired.

For the case of a 25%–400% magnification in steps of 1%, a minimum resolution of 0.3%–0.5% is achieved. The minimum resolution is decided according to characteristics of a motor, a lamp for illumination, mirrors, and a mass of a moving device used to move the mirrors at a desired scanning speed.

In this case, a ratio of the scanning speed between the minimum magnification 25% and the maximum magnification 400% is 16 (i.e., =400/25). Therefore, the scanning speed of the minimum magnification is 16 times the scanning speed of the maximum magnification.

Further, in a scanner which has a carriage used for moving an optical unit, when a scanning operation is completed, the carriage is returned to a home position. Therefore, the rotating speed of the motor is decided according to a speed of the carriage returning as well as a power of the motor.

When a count number of the CPU for rotating one angular step (for example, 0.72°) is 340, a minimum resolution is about 0.29% (=1/340). Therefore, a count number of more than 1000 is needed for rotating one angular step for setting the magnification by a 0.1% step. That is, when a count number of the CPU for rotating one angular step is 1000, a minimum resolution is 0.1% (=1/1000).

To execute the 1000 counts, it is necessary to increase a drive ratio of the stepping motor or to increase the number of base clocks of the CPU. However, both of these ways have problems. In the case of increasing the drive ratio of the stepping motor, a moving speed of a carriage becomes deficient. Further, because a CPU has a limited number of base clocks, it is difficult to increase the number of of base clocks the CPU to execute 1000 counts.

SUMMARY OF THE INVENTION

Accordingly, one object of the present invention is to solve the above-mentioned problems.

Another object of the present invention is to provide a novel image scanner which can execute a fine tuning of the magnification by controlling a scanning speed.

Yet another object of the present invention is to provide an image scanner in which the magnification of a document may be selected in steps of 0.1 percent.

To achieve this, the present invention is directed to an image scanner which includes an optical image reading unit which reads an image from a document and a carriage which carries the optical image reading unit. Also included is a motor which drives the carriage, and a driver which outputs a sequence of drive signals to drive the motor. Further, a timing of each drive signal of the sequence of drive signals output by the driver is selected in accordance with a desired incremental magnification of the document. Therefore, the incremental magnification of a document may be selected in steps of 0.1%.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
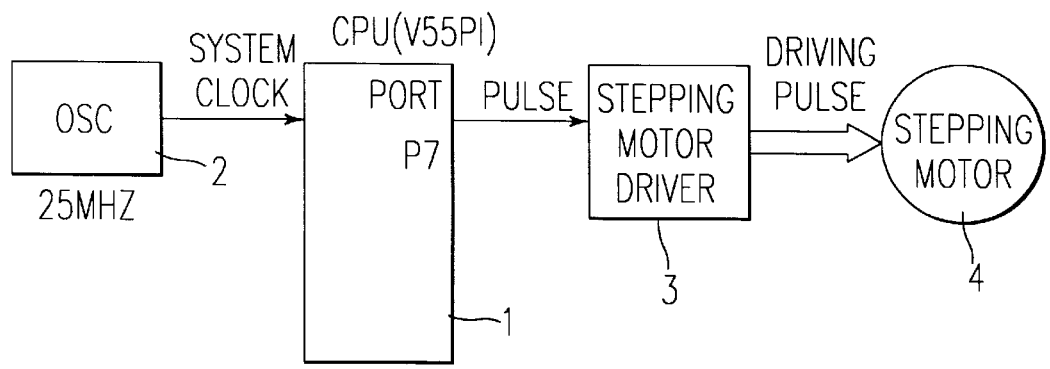
FIG. 1 is a diagram of control unit of a stepping motor according to the present invention.

Referring now to the drawings, wherein like reference numerals designate identical or corresponding parts throughout the several views.

FIG. 1 is a diagram of a control unit of a stepping motor according to the present invention. A stepping motor 4 drives a scanner (not shown). Generally, the stepping motor 4 is a five phase stepping motor and the mode of drive is a half step drive by ten phase driving pulse. This ten phase driving pulse is generated by a driving unit and a CPU outputs a pulse signal to the driving unit according to a desired magnification. In the driving unit, the pulse from the CPU is increased and decreased in sequence for synchronization of the motor and for preventing a vibration of a scanner.

In FIG. 1. a CPU may be, for example, a V55P1 manufactured by NEC. The V55P1 includes a real-time output port and a macro service. The V55P1 can generate a pulse for controlling the stepping motor 4 without requiring burdensome software by using the real-time output port and the macro service. In addition, any other CPU may be used as a substitute for the V55P1.

Figure 6:
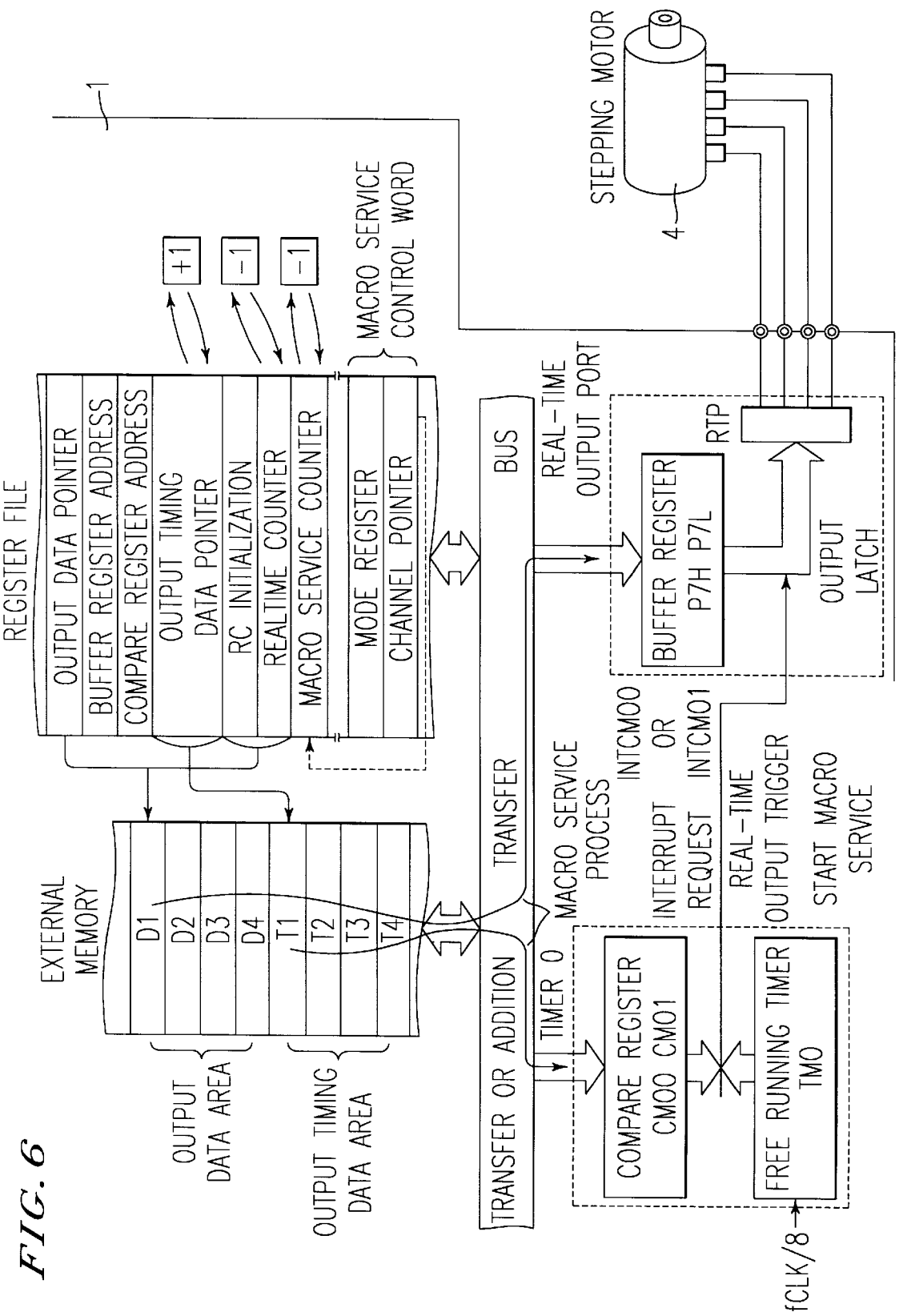
FIG. 6 is a diagram of the CPU 1 shown in FIG. 1

The real-time output port function is the function that outputs data in a port buffer of the CPU 1 in steps of one bit at programmable intervals from a timer 0 (see FIG. 6). The timer 0 includes a timer register 0, compare register and capture register, and works as 416 bit free running timer. The macro service is a microprogram that executes a simple program, for example, simple data transfer, and this macro program is stored in the CPU as firmware.

As shown in FIG. 1, a port P7 of the CPU 1 is connected to a stepping motor driver 3.

The CPU 1 controls a rotating speed of the stepping motor 4 by way of the stepping motor driver 3. In addition, a clock pulse oscillator 2 is connected with the CPU 1. The clock pulse oscillator generates a system clock and inputs this to the CPU 1.

FIG. 6 is a diagram of the CPU 1 shown in FIG. 1. Output pattern data (e.g. D1, D2, D3, D4) for changing a phase of the stepping motor 4 is stored in an output data area in an external memory. A pulse rate data (e.g., T1, T2, T3, T4) for controlling a driving interval of the stepping motor 4 is stored in an output timing data area in the external memory.

A real-time output port works according to a timer 0 and a source of a count clock of the timer 0 is a system clock (fCLK)/. This system clock fCLK is not variable and the resolution of stepping motor 4 is fCLK/8.

The present invention achieves a magnification setting having a 0.1% step according to a change pulse rate and an average of changed pulse rate using the macro service of the CPU.

Figure 2:
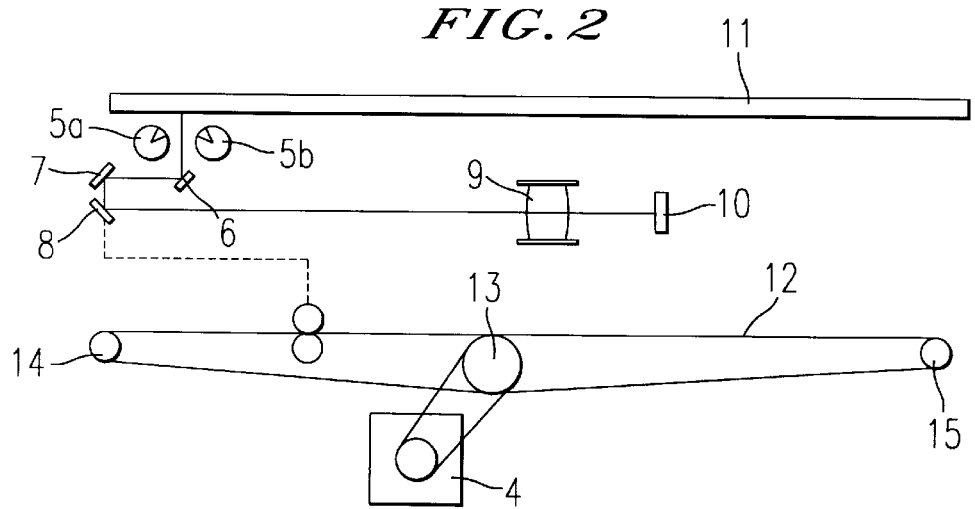
FIG. 2 is a diagram of a scanner according to present invention.

FIG. 2 is a diagram of a scanner according to the present invention. The stepping motor 4 rotates and this rotation is transferred to a pulley 13. The rotation of the pulley 13 is transferred to a driving wire 12, and thus the driving wire 12 rotates. The driving wire 12 is connected to the first and second carriages 14, 15 which are set in parallel with a contact glass 11. The first and second carriages 14, 15 scan a document on the contact glass 11 and read an image of the document. The first and second carriages 14, 15 are moved according to the rotation of the driving wire 12.

The first carriage 14 includes light sources 5a and 5b and a first mirror 6. The light sources 5a and 5b illuminate a document placed on the contact glass 11 and include, for example, a fluorescent lamp. The second carriage 15 includes a second mirror 7 and a third mirror 8.

The first carriage 14 moves in parallel with the contact glass 11 and the light sources 5a and 5b illuminate as document on the contact glass 11. A light reflected from a document on the contact glass 11 is reflected by the first mirror 6. The second carriage, 15 which has the second mirror 7 and the third mirror 8, move in the same direction as the first carriage 14 and have a moving speed which is a half of the speed of the first carriage 14.

The light from the first mirror 6 is then reflected by the second mirror 7 and the third mirror 8. The light reflected by the third mirror 8 is transmitted to a charged coupled device (CCD 10 by way of a lens 9. Thus, an image of the document on the contact glass 11 is illuminated by the light sources 5a and 5b and read by the CCD 10. The image data of the document is then output from the CCD 11 line by line.

Figure 5:
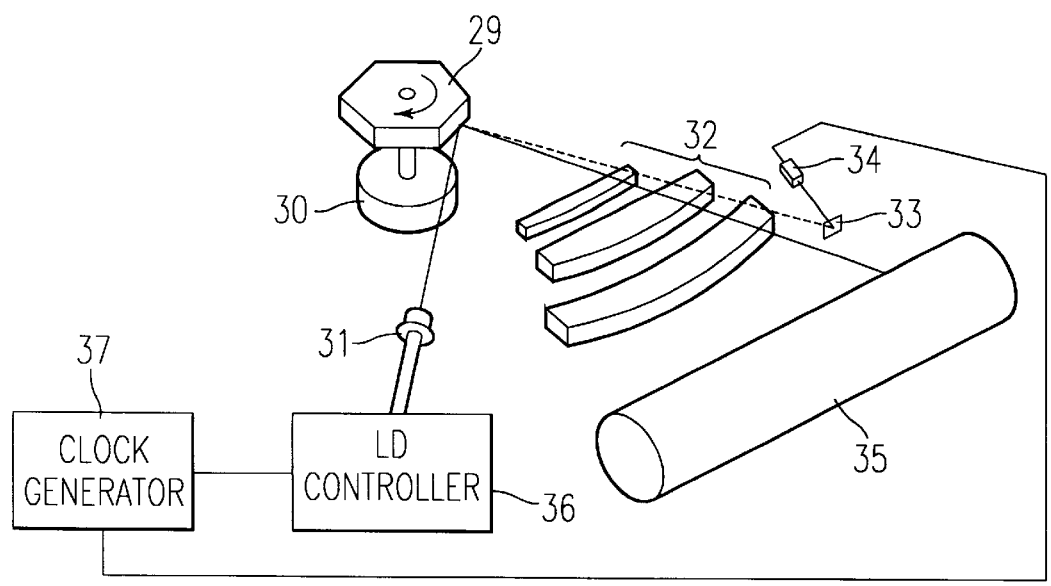
FIG. 5 is a diagram of a writing unit according to the present invention.

The image data of a document is input to, for example, an image forming apparatus which includes a scanner. The image forming apparatus forms a document image by an electrophotographic process which includes a writing unit. FIG. 5 is a diagram of a writing unit. The image data is input to a laser diode 31 and the laser diode 31 generates laser light according to the input image data.

The laser light output from the laser diode 31 is reflected by a polygon mirror 29 which is rotated by a motor 30. The laser light reflected by the polygon mirror 29 is transmitted to a photoconductive drum 35 by way of fθ lenses 32 and the laser light scans the surface of the photoconductive drum 35 with a constant velocity. This scanning operation is referred to as a main scanning operation.

A detector 34 which detects laser light for synchronization and a mirror 33 are at a side of the fθ lenses 32. The laser light is reflected by the mirror 33 and input to the detector 34. The laser light is detected by the detector 34 at each scanning. A detecting signal from the detector 34 is transmitted to a clock generator 37 and the clock generator 37 generates a clock signal for synchronization. The LD (laser diode) controller 36 controls synchronization of the laser diode 31 according to the clock signal from the clock generator 37. After each one main scanning, the photoconductive drum 35 rotates an amount of one line for sub-scanning.

The photoconductive drum 35 becomes charged by a charging unit (not shown) and exposed by the laser light from the laser diode 31, and a latent image (not shown) is formed according to the original document image (not shown) read by the scanner. This latent image formed on the photoconductive drum 35 is developed by a toner (not shown) at a developer unit (not shown). The toner image (not shown) formed on the photoconductive drum 35 by the developer (not shown) is transferred to a recording paper (not shown) by a transfer unit (not shown). The recording paper (not shown) which has a toner image (not shown) is transferred to a fusing unit (not shown) and the toner image (not shown) is fused on the recording paper (not shown). Then a residual toner (not shown) on a surface of the photoconductive drum 35 is removed by a cleaning unit (not shown). After cleaning, the surface of the photoconductive drum 35 is charged again by the charging unit (not shown).

Figure 3:
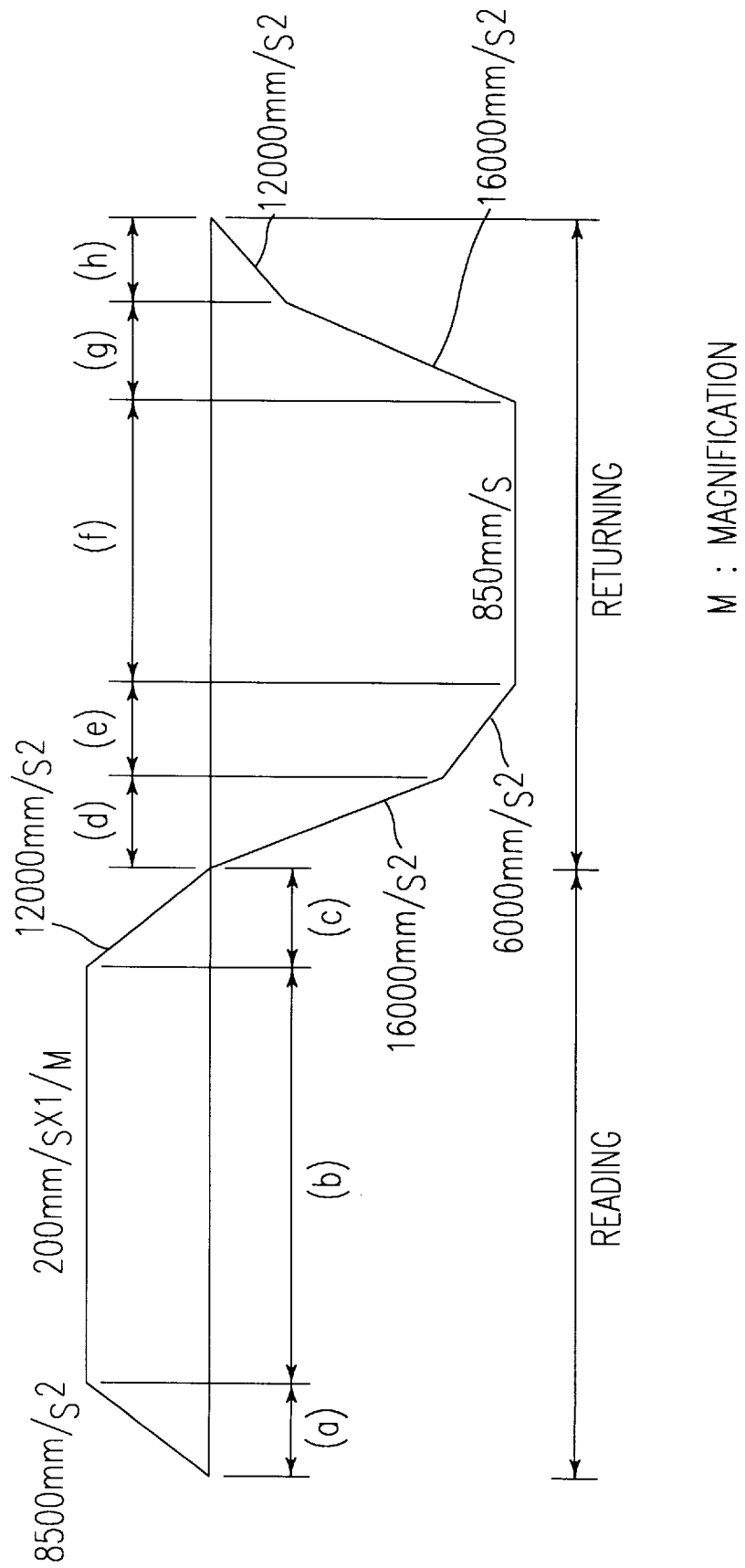
FIG. 3 is a diagram illustrating control of the moving of the carriage according to the present invention.

FIG. 3 is a diagram illustrating a control operation for moving the carriage. The carriage movement is executed according to a rotation of the stepping motor 4. Therefore, the rotation of the stepping motor 4 is controlled as shown in FIG. 3.

At a start of an image reading operation, the stepping motor 4 rotates with linear acceleration from a standing start to a predetermined speed (shown as (a) in FIG. 3). Then, the stepping motor 4 rotates at a constant-speed and the scanner reads a document on the contact glass (shown as (b)). For lx magnification, the stepping motor 4 rotates at 200 mm/s. After the document is read, the stepping motor 4 rotates with linear deceleration (shown as (c)) and stops.

Then, the stepping motor 4 rotates in a reverse direction for returning the carriage to its home position. First, the stepping motor 4 rotates with acceleration (shown in (d) and (e)). Then, the stepping motor 4 rotates at a constant-speed (shown as (f)) and after this constant-acceleration period, the stepping motor 4 rotates with deceleration and stops at the home position (shown as (g) and (h)).

The above described rotations including acceleration, deceleration and constant-speed are controlled by the macro service which controls in real-time the port P7 of the CPU 1 in FIG. 1. The stepping motor driver 3 generates driving pulses by dividing a pulse by ten (the pulse being sent from the port P7 of the CPU 1). The stepping motor 4 is rotated by one angular step. The hall step driving is executed for smooth rotation.

The CPU 1 includes a timer (not shown)for changing magnification. The timer (not shown) of the CPU 1 counts the number of clocks (not shown) the system clock and the CPU 1 outputs pulses according to a predetermined count number. The CPU 1 outputs the pulses from the port P7 to the stepping motor driver 3. The stepping motor driver 3 generates driving pulses according to the pulse from the CPU 1 and drives the stepping motor 4 by one angular step.

When a magnification desired is 100%, the port P7 outputs a pulse to the stepping motor driver 3 every 341 clocks counted by the timer (not shown). This is the predetermined count number. When the clock count number is increased to 342 (i.e., 341+1) or decreased to 340 (i.e., 341−1) for fine-tuning, a change in the magnification value is as follows:

Case of 342 (+1): 342/341=1.0029 (about 0.3% increase)
Case of 341 (−1): 340/341=0.9971 (about 0.3% decrease).

In these cases, the minimum value of change is about 0.3%. However, in the present invention, the scanner may change a desired magnification by 0.1% steps using an average of a speed. For example, to increase the average of a speed +0.1%, the clock count number counted by the timer (not shown) of the CPU 1 is increased by one clock once every third count of the clock count number by the timer, as follows:

341, 341, 342, 341, 341, 342, 341, . . .

In this case, the increase in speed is about 0.1% (i.e., =0.29/3). To increase an average speed of 0.2%, a clock count number counted by the timer (not shown) of the CPU 1 is increased by one clock twice out of every three count of the clock count number by the timer, as follows:

341, 342, 342, 341, 342, 342, 341, . . .

In this case, the increase in speed is about 0.2% (i.e., =0.29/3). To increase the average speed of 0.3%, a clock count number counted by the timer (not shown) of the CPU 1 is increased by one clock every count, as follows:

342, 342, 342, 342, 342, 342, 342, . . .

To decrease an average speed, the clock count number is executed similar to the case for increasing the speed.

Below is a set of clock count numbers used for fine-tune magnification.

| | |
|---|---|
| 99.7% | 340, 340, 340, 340, 340, 340, 340, . . . |
| 99.8% | 341, 340, 340, 341, 340, 340, 341, . . . |
| 99.9% | 341, 341, 340, 341, 341, 340, 341, . . . |
| 100% | 341, 341, 341, 341, 341, 341, 341, . . . |
| 100.1% | 341, 341, 342, 341, 341, 342, 341, . . . |
| 100.2% | 341, 342, 342, 341, 342, 342, 341, . . . |
| 100.3% | 342, 342, 342, 342, 342, 342, 342, . . . |

In these cases, a clock count number counted by the timer is changed once or twice out of every three counts of the timer. However, the present invention is not limited to these cases. In the present invention, any combination of clock counts is possible. For example, a clock count number counted by the timer may be increased once every two times, once every four times, once every five times or twice every five times, and so on. Moreover, a value used for changing a clock count may be a number different than the number "1" (i.e., 341+"2").

The angular step after the driving pulse is output from the stepping motor driver 31 is constant (e.g., 0.04373 mm) and does not depend on the count number (e.g. 340, 341, 342). The distance a carrying means moves when the stepping motor 4 steps one angular step forward is also constant accordingly. The speed of the carrying means is changed because the times for rotating one angular step is varied according to changing the clock count number for one angular step.

In the above-mentioned, the minimum resolution without using average speed is 0.3% However, when the minimum resolution without using average speed is 0.5%, magnification change by a 0.1% step may be executed by changing the clock count once every five counts of the timer.

The control of the speed of the stepping motor 4 described above is for fine-tuning the magnification in the direction of sub-scanning. However, a changing magnification must be executed for both a main scanning and a sub-scanning direction. A changing magnification in the direction of main scanning is executed by changing a writing clock (not shown).

For the case of a 100% magnification, when the rotation speed of rotating the stepping motor is changed by a 0.1% step, the fine-tuning is executed by a 0.1% step. And in this case, when the writing clock (not shown) is changed by a 0.1% step, a magnification in a direction of main scanning is changed by a 0.1% step also. Therefore, magnification in both a direction of main scanning and sub-scanning is changed by a 0.1% step.

For the case of a 200% magnification, when the rotation of the stepping motor is changed by a 0.1% step, the fine-tuning is executed by a 0.2% step, not a 0.1% step. For 0.1% fine-tuning, the speed of the stepping motor 4 must be changed by 0.05% step. This 0.05% is a half of the 0.1% for the 100% magnification. In this case, the writing clock (not shown) is changed by a 0.1% step.

For the case of a 50% magnification, when the rotation speed of the stepping motor 4 is changed by a 0.1% step, the fine-tuning is executed by a 0.05% step, not a 0.1% step. For 0.1% fine-tuning, the speed of the stepping motor must be changed by a 0.2% step. This 0.2% step is twice that of the 0.1% step for 100% magnification. In this case, the writing clock (not shown) is changed by a 0.1% step.

In these controlling operations, the step of fine-tuning is executed by a value which is corrected according to a value of the magnification as follows:

$A' = A \times 1/M$, wherein
  $A'$=corrected value of fine-tuning;
  $A$=value of fine-tuning for 100%; and
  $M$=magnification.

And there is another way for fine-tuning in both directions of scanning main and sub-scanning. In this way, the fine-tuning is executed based on the changing of speed of the stepping motor 4. The speed of the stepping motor 4 is changed by 0.1% step in any magnification. In this way, the writing clock (not shown) is changed by a step according to the magnification. For example, when the magnification is 200% and the fine-tuning of the speed of the stepping motor is executed by 0.1%, because the magnification is changed by 0.2% step, the writing clock (not shown) is changed by 0.2%. Moreover, it is possible that the fine-tuning is executed according to selecting an operator's selection of one of these two ways by operator of fine-tuning.

Figure 4:
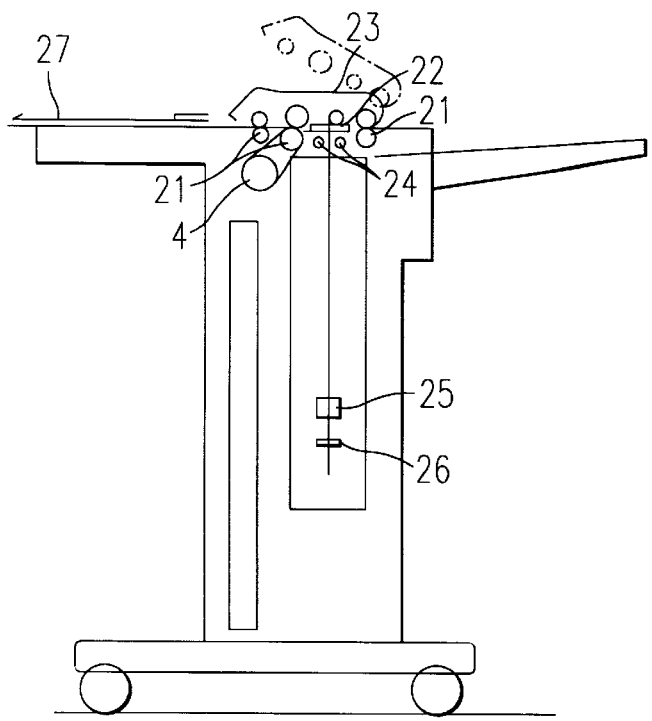
FIG. 4 is a diagram of another type of a scanner according to the present invention.

FIG. 4 is a diagram of another type of a scanner according to the present invention. In the scanner of FIG. 2, the document is set on the contact glass 11 and the document does not move. However, in the scanner of FIG. 4, a document is moved and an image of the document is read.

In FIG. 4, there is a document table 20 for placing a document 27 on, a contact glass 22 and a cover 23 which covers the contact glass 22. In addition, feeding rollers 21 are set on the main body and the cover 23, and the feeding rollers 21 feed the document 27 to the contact glass 22 with a predetermined constant velocity. The feeding rollers 21 are driven by a stepping motor 4. Beneath the contact glass 22, a light source 24 (which includes, for example, a fluorescent lamp) and a lens 24 and CCD 26 are set.

When the feeding rollers 21 are driven by the stepping motor 4, the document 27 on the document table 20 is fed to the contact glass 22. The light source 24 illuminates the document 27 fed by the feeding roller 21 and the image of the document 27 is read by the CCD 26 by way of via the lens 25. The CCD 26 outputs data line by line according to the image data of the document 27.

The image data from the CCD 26 is used by an image forming apparatus, for example, the apparatus shown in FIG. 5, and the image of the document 27 is formed. The stepping motor 4 in this scanner is controlled in the same way as the stepping motor 4 in FIG. 2 which uses an average speed and the fine-tuning of the magnification may be executed.

This the present invention may be conveniently implemented using a conventional general purpose digital computer or microprocessor programmed according to the teachings of the present disclosure, as will be apparent to those skilled in the computer art. Appropriate software coding can readily be prepared by skilled programmers based on the teachings of the present disclosure, as will be apparent to those skilled in the software art. The present invention may also be implemented by the preparation of application specific integrated circuit or by interconnecting an appropriate network of conventional components, as will be readily apparent to those skilled in the art.

Obviously, numerous modifications and variations of the present invention are possible in light of the above teachings. It is therefore to be understood that within the scope of the appended claims, the invention may be practiced otherwise than as specifically described herein.

This application is based on Japanese patent application 9-173383 filed in the Japanese Patent Office on Jun. 30, 1997 the entire contents of which are hereby incorporated by reference.

What is claimed as new and is desired to be secured by Letters Patent of the United States is:

1. An image scanner, comprising:
    an optical image reading unit which reads an image from a document;
    a carriage which carries said optical image reading unit;
    a motor which drives said carriage;
    a driver which outputs a sequence of drive signals to drive said motor, wherein a timing of each drive signal of said sequence of drive signals output by said driver is selected in accordance with a desired incremental magnification of said document and wherein said incremental magnification occurs in steps of 0.1%;
    a clock signal generator which generates and outputs a clock signal to said driver;
    a counter which counts a value of said clock signal output to said driver, wherein said timing of each drive signal of said sequence of drive signals output by said driver is a function of said value of said clock signal output to said driver counted by said counter, and wherein said driver outputs each drive signal of said sequence of drive signals output by said driver using a repeating sequence of said value of said clock signal output to said driver counted by said counter such that a subsequent incremental change in magnification changes only one of said value of said clock signal of said repeating sequence.

2. The image scanner according to claim 1, wherein said repeating sequence includes a sequence of at least one of two values, three values, four values, and five values counted by said counter.

3. The image scanner according to claim 1, wherein said repeating sequence includes a sequence of three values 341, 340, and 340 counted by said counter.

4. The image scanner according to claim 1, wherein said repeating sequence includes a sequence of three values 341, 341, and 340 counted by said counter.

5. The image scanner according to claim 1, wherein said repeating sequence includes a sequence of three values 341, 341, and 342 counted by said counter.

6. The image scanner according to claim 1, wherein said repeating sequence includes a sequence of three values 341, 342, and 342 counted by said counter.

7. A system for scanning an image, comprising:
    image reading means for reading an image from a document;
    carrying means for carrying said image reading means;
    driving means for driving said carriage;
    outputting means for outputting a sequence of drive signals to drive said driving means, wherein a timing of each drive signal of said sequence of drive signals output by said outputting means is selected in accordance with a desired incremental magnification of said document and wherein said incremental magnification occurs in steps of 0.1%;
    a clock signal generator which generates and outputs a clock signal to said driving means;
    a counter which counts a value of said clock signal output to said driving means, wherein said timing of each drive signal of said sequence of drive signals output by said outputting means is a function of said value of said clock signal output to said driving means counted by said counter, and wherein said driving means outputs each drive signal of said sequence of drive signals output by said outputting means using a repeating sequence of said value of said clock signal output to said driving means counted by said counter such that a subsequent incremental change in magnification changes only one of said value of said clock signal of said repeating sequence.

8. The system according to claim 7, wherein said repeating sequence includes a sequence of at least one of two values, three values, four values, and five values counted by said counting means.

9. The system according to claim 7, wherein said repeating sequence includes a sequence of three values 341, 340, and 340 counted by said counting means.

10. The system according to claim 7, wherein said repeating sequence includes a sequence of three values 341, 341, and 340 counted by said counting means.

11. The system according to claim 7, wherein said repeating sequence includes a sequence of three values 341, 341, and 342 counted by said counting means.

12. The system according to claim 7, wherein said repeating sequence includes a sequence of three values 341, 342, and 342 counted by said counting means.

13. An image scanner, comprising:
    an optical image reading unit which reads an image from a document;
    a feeder which feeds said document to said optical image reading unit;
    a motor which drives said feeder; and
    a driver which outputs a sequence of drive signals to said drive motor, wherein a timing of each drive signal of said sequence of drive signals output by said driver is selected in accordance with a desired incremental magnification of said document and wherein said incremental magnification occurs in steps of 0.1%;
    a clock signal generator which generates and outputs a clock signal to said driver;

a counter which counts a value of said clock signal output to said driver, wherein said timing of each drive signal of said sequence of drive signals output by said driver is a function of said value of said clock signal output to said driver counted by said counter, and wherein said driver outputs each drive signal of said sequence of drive signals output by said driver using a repeating sequence of said value of said clock signal output to said driver counted by said counter such that a subsequent incremental change in magnification changes only one of said value of said clock signal of said repeating sequence.

* * * * *